United States Patent [19]
Astle

[11] Patent Number: 5,812,787
[45] Date of Patent: Sep. 22, 1998

[54] VIDEO CODING SCHEME WITH FOREGROUND/BACKGROUND SEPARATION

[75] Inventor: Brian Astle, Plainsboro, N.J.

[73] Assignee: Intel Corporation, Santa Clara, Calif.

[21] Appl. No.: 497,367

[22] Filed: Jun. 30, 1995

[51] Int. Cl.[6] .................................................. G06K 9/46
[52] U.S. Cl. .................... 395/200.77; 382/236; 382/238; 348/390; 348/586
[58] Field of Search ........................... 364/514 R, 514 A; 348/384, 390, 400, 401, 402, 409, 415, 416, 586; 382/174, 236, 238; 395/200.77

[56] References Cited

U.S. PATENT DOCUMENTS

| | | | |
|---|---|---|---|
| 4,591,909 | 5/1986 | Kuroda et al. | 348/415 |
| 4,841,575 | 6/1989 | Welsh et al. | 395/2.69 |
| 5,086,480 | 2/1992 | Sexton | 382/171 |
| 5,150,432 | 9/1992 | Ueno et al. | 382/250 |
| 5,253,058 | 10/1993 | Gharavi | 348/415 |
| 5,262,856 | 11/1993 | Lippman et al. | 348/415 |
| 5,268,967 | 12/1993 | Jang et al. | 382/132 |
| 5,422,674 | 6/1995 | Hooper et al. | 348/409 |
| 5,557,684 | 9/1996 | Wang et al. | 382/236 |
| 5,564,001 | 10/1996 | Lewis | 395/154 |

*Primary Examiner*—Min Jung
*Attorney, Agent, or Firm*—William H. Murray, Esq.; N. Stephan Kinsella, Esq.

[57] ABSTRACT

A computer-implemented method and apparatus for encoding pictures of a sequence of pictures. According to a preferred embodiment, an encoding system determines a relatively fixed background of the sequence of pictures, and transmits the background to a decoding system. Foreground objects of a current picture are separated from the background, and motion compensation encoding of the foreground objects is performed with respect to at least one previous picture. The encoded foreground objects are then transmitted to the decoding system.

31 Claims, 5 Drawing Sheets

FIGURE 1. ENCODING SYSTEM

FIGURE 2. DECODING SYSTEM

VIDEO CODING SCHEME WITH FOREGROUND/BACKGROUND SEPARATION

BACKGROUND OF THE INVENTION

1. Field of the Invention

The present invention relates to signal processing and, in particular, to computer-implemented processes and apparatuses for video coding using foreground and background separation.

2. Description of the Related Art

This invention relates to video signal processing in which video signals representative of video pictures of a motion video sequence are compressed, or encoded, to form an encoded bitstream. As used herein, "picture" and "video picture" may interchangeably refer to signals representative of an image as hereinabove described. In some encoding standards, pictures are referred to as video frames.

The portion of an encoded bitstream representing a compressed picture may be stored in a mass storage device such as a hard disk drive or compact disk read-only-memory (CD-ROM) in its compressed format in order to conserve storage space. When the compressed picture is later retrieved, it may be decompressed and, for example, displayed on a monitor. A higher amount of compression of the blocks constituting an image tends to lower the number of bits needed to represent the image, but also tends to diminish the quality of the image reconstructed by the decoder.

The encoded bitstream may also be transmitted to one or more remote signal processing systems such as video conferencing nodes which decode the encoded signals. These video conferencing nodes may be personal computer (PC)-based systems communicating with each other over a selected transmission medium. Possible transmission media include Integrated Services Digital Network (ISDN) and Public Switched Telephone Network (PSTN) telephone connections. Although ISDN connections provide a higher bandwidth than PSTN connections, ISDN connections are currently less readily available and more expensive than PSTN connections. Because transmission media have finite bandwidths, in order to provide video conferencing of satisfactory quality, each PC system preferably compresses or encodes in real time the video signals corresponding to the local participant and transmits the resulting compressed signals or bitstreams to the PC systems of the remote participants.

The objective of transmitting video information is to maximize perceived picture quality within constraints of the transmission channel. Most transmission channels have a fixed capacity, leading to a tradeoff between the quality of each picture and the picture rate. Thus, pictures may generally be transmitted at a fast rate but at a lower quality, or vice-versa. A standard transmission rate in the United States is 30 pictures/second in the International Organization for Standardization (ISO) ISO/IEC 11172 Moving Pictures Experts Group-1 standard (MPEG-1), or 30 frames/second in the ISO/IEC 13818 (MPEG-2) standard. The aforementioned MPEG-1 (ISO/IEC 11172) and MPEG-2 (ISO/IEC 13818) standards are incorporated herein in their entirety by reference. Another video coding standard is H.261 (P×64), developed by the International Telegraph Union (ITU).

In some usages, each PC system receives and decompresses compressed signals from the PC systems of remote participants to play decompressed video signals locally. Encoders may also, in some usages, encode video pictures offline to perform more computation-intensive and more efficient encoding.

Such encoding operations that compress video image signals typically operate on subsets of the image, such as (8×8) blocks of pixels, or on macroblocks comprising a number of such blocks. A macroblock typically comprises a (16×16) array of luminance pixels (also known as "luma pels") and two associated (8×8) blocks of chrominance, or chroma, pixels. The (16×16) luma array is further divided into four (8×8) blocks, and all six blocks in a macroblock are typically transformed using the forward discrete cosine transform (DCT), quantized, and further encoded. Typically, the (8×8) blocks of the image to be encoded are transformed by a forward DCT to generate a transformed signal comprising 64 DCT coefficients, which are also arranged in an (8×8) block.

Motion compensation is commonly utilized in signal processing techniques in which successive video pictures are compressed. Motion compensation techniques exploit the temporal correlation that often exists between consecutive pictures, in which there is a tendency of some objects or image features to move within restricted boundaries from one location to another from picture to picture.

For instance, picture 1 may contain an object, and picture 2 may contain an identical or very similar set of pixels corresponding to the object spatially displaced by a certain number of pixels from the location of the same set of pixels in picture 1. If picture 1 is transmitted by a video processor to a remote video processor (which performs any necessary decompression or other decoding), picture 2 may be transmitted without the pixels corresponding to the object. Instead, information such as motion vectors is sent along with picture 2 (which may also be encoded using other techniques). These motion vectors may be utilized by the remote receiving video processor when decoding the received picture 2 to reproduce the object from picture 1 at a new location within picture 2. Since motion vectors can often be represented with fewer bits than the pixels that constitute the object, fewer bits need to be transmitted (or stored) in order to recreate the object in Picture 2. As will be appreciated by those skilled in the art, difference blocks may also be transmitted along with motion vectors to improve the reconstruction process. Such difference blocks contain the residual motion error.

Pictures such as picture 1 that are not based on information from previously transmitted and decoded pictures are called intra pictures, or I pictures. Video pictures which are encoded with motion compensation techniques are referred to as predicted pictures, or P pictures, since their content is predicted from the content of previous I or P pictures. A similar nomenclature may be used with reference to individual blocks or macroblocks.

The motion compensation procedure may be performed at the encoder level by comparing given regions or blocks within a current picture to many regions or blocks within the previous picture. The process of comparing a given block of one picture to blocks of another picture to find a sufficiently similar match is often called "block matching," and the process of comparing one picture against another in this manner is often called "picture differencing." Block matching employs "difference measurement" between any given pair of blocks. A difference measurement corresponds to the overall degree of difference of the two regions based, for example, on mean square error (MSE) or mean absolute error (MAE). As will be appreciated by those skilled in the art, various differencing methods may be used to determine the difference measurements described above. The basis of such a difference measurement is often a calculation known as the L1 Norm, which has the following form:

$$L1 \text{ Norm} = \sum_{i=0}^{i=n} \sum_{j=0}^{j=m} |a_{ij} - b_{ij}|$$

where:
$a_{ij}$ is a pixel in the ith row and jth column of the first block;
$b_{ij}$ is a pixel in the ith row and jth column of the second block;
n is the number of rows in a block; and
m is the number of columns in a block.

It will be appreciated by those skilled in the art that the lower the difference indicated by the L1 Norm calculation, the more similar are the two blocks being compared. Use of more similar reference blocks tends to provide a motion compensation-encoded bitstream with lower bits. It will also be appreciated that calculations other than the L1 Norm may be utilized to perform difference measurements between two pictures. For example, the L2 Norm has the following form:

$$L2 \text{ Norm} = \sum_{i=0}^{i=n} \sum_{j=0}^{j=m} (a_{ij} - b_{ij})^2$$

If the difference measurement is below a predetermined threshold, the blocks are considered to be similar enough that a block match is indicated. If so, the block in the previous picture may be utilized by the video decoder to reproduce the same block in the current picture. If the blocks match very closely, the motion vector alone may suffice, without any residual error information transmitted. If the difference between the matched blocks is significant enough, however, residual error information, in the form of an encoded difference block, may be transmitted to the decoding system along with the motion vector to allow the copied block to be adjusted to more accurately represent motion compensation-encoded block.

One problem encountered in motion compensation encoding techniques often occurs when a foreground object moves to a new position over the background. For instance, in a video conferencing environment, the foreground may include the head, chest, and arms of a user, while the background is a wall and other relatively stationary objects in or features of the room behind the user. If the user's arm is waved up and down in the course of a sequence of video pictures encoded and transmitted to a remote video conferencing node, the picture update rate may drop due to the limited transmission bandwidth and increase in coding complexity. The new position of the arm may differ considerably from the previous position, and must be constructed over the fixed background. If the image is divided into square or rectangular blocks for the purpose of motion compensation, then the fixed background can interfere with the ability to use motion compensation. This arises because two blocks contain the arm: the current, or target, block which is to be encoded, in which the arm is located over the new background; and the previous reference block which has already been decoded by the decoder, in which the arm is located over another section of the background. Each of these two blocks may both contain a similar pixel group showing the arm or segment thereof, but each block may have different background information outside the arm pixels, which cause too great a difference between the blocks to allow a match. (Alternatively, a very large amount of residual error may be encoded, which may be expensive in terms of computation or communications bandwidth.)

In this case, the new arm must be constructed directly over the background at the new location, without motion compensation, e.g. using an intrablock. However, this requires more bits to encode than motion vectors, and it may not be possible to transmit enough bits to adequately reconstruct such moving objects. For example, when the arm is drawn in the new position, the old background must also be canceled out. If not enough bits can be spared, it will be difficult to completely cancel out the background, so the arm in the new position may take on a noisy, translucent appearance in which both the arm and the background are blended together. Such artifacts, particularly translucency, are very objectionable.

There is thus a need for improved methods and apparatuses for encoding video pictures.

SUMMARY

There is provided herein a computer-implemented method and apparatus for encoding pictures of a sequence of pictures. According to a preferred embodiment of the invention, an encoding system determines a relatively fixed background of the sequence of pictures, and transmits the background to a decoding system. Foreground objects of a current picture are separated from the background, and motion compensation encoding of the foreground objects is performed with respect to at least one previous picture. The encoded foreground objects are then transmitted to the decoding system.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Video Processing System Hardware

Figure 1:
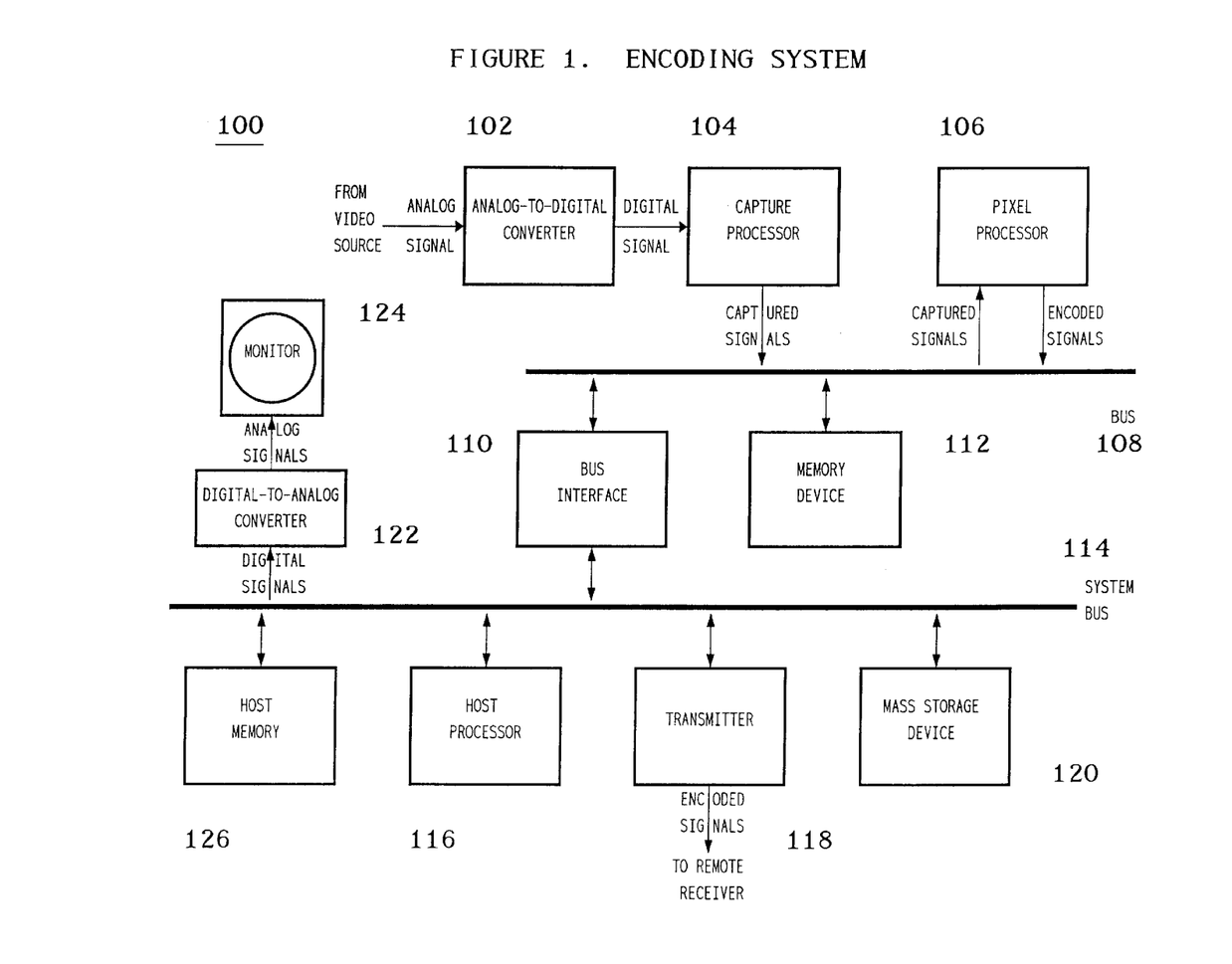
FIG. 1 is a computer-based video processing system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each picture of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, as described in more detail below, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
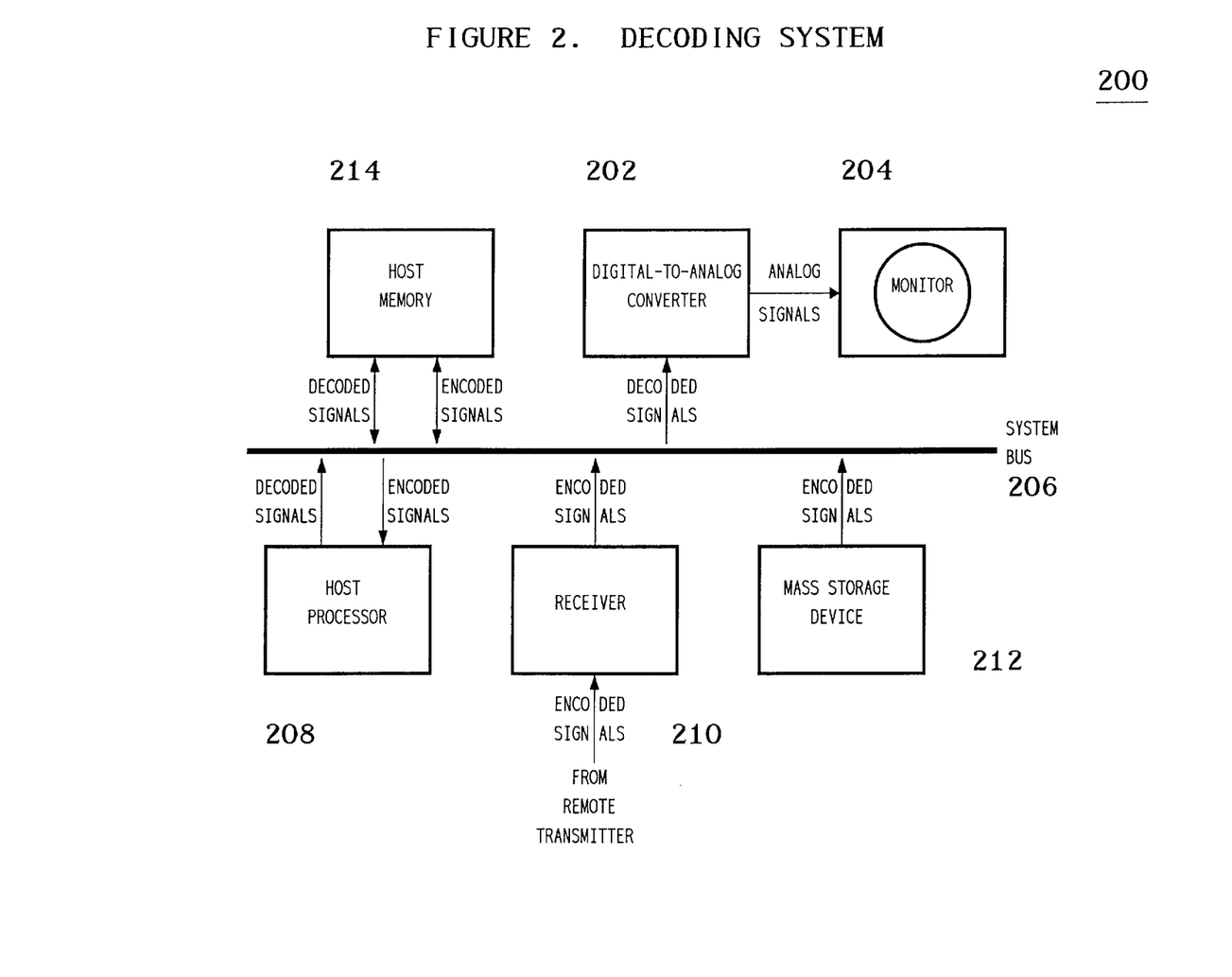
FIG. 2 is a computer-based decoding system for decoding the video signals encoded by the video processing system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled pictures. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386™, 486™, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC) -based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded video image signals in real-time during the capture and encoding of video signals to monitor the encoding processing. In a preferred embodiment, encoding system 100 encodes video image signals in real time to yield an encoded bitstream, and transmits the encoded bitstream to decoding system 200. Encoding system 100 implements the present invention as described in further detail hereinbelow.

Foreground/Background Separation

In the present invention, encoding system 100 provides for motion-compensation based encoding utilizing separate foreground and background bitmaps. The present invention is thus particularly suited for applications having a relatively fixed background with moving foreground features or objects, such as a video conferencing system in which the camera and thus background are relatively fixed and stationary, and foreground objects include objects such as people talking or moving.

Figure 3:
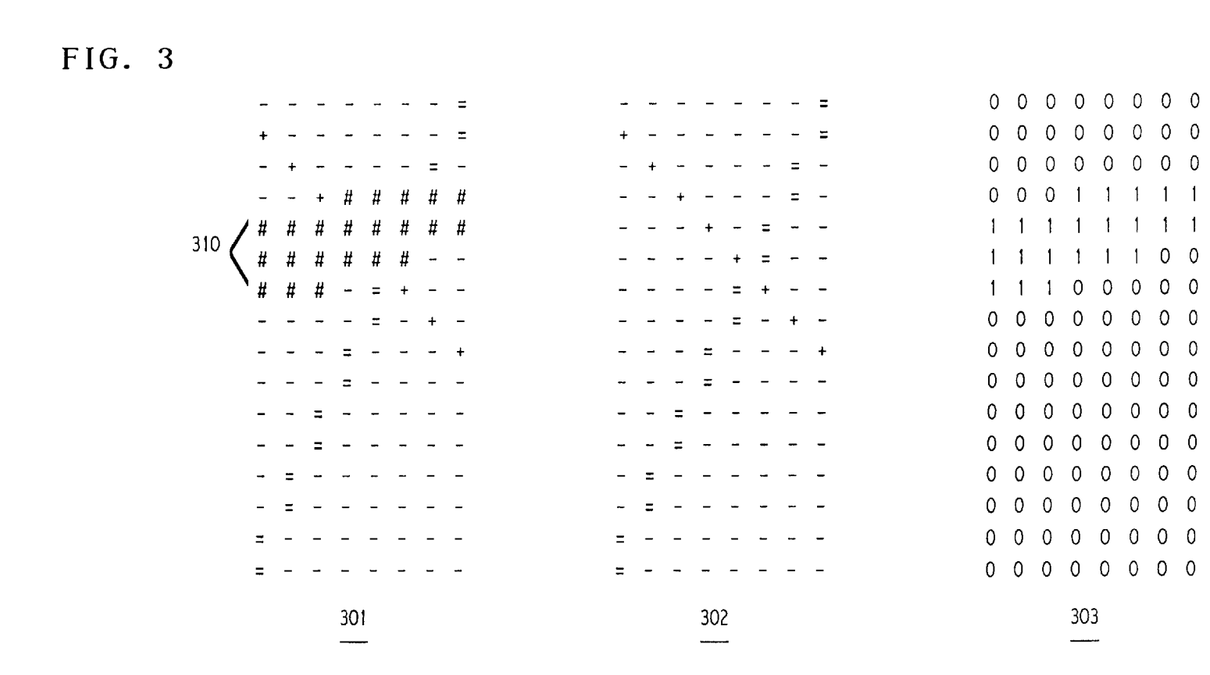
FIGS. 3 and 4 illustrate previous, background, and separation bitmaps in accordance with a preferred embodiment of the present invention.

In a preferred embodiment, both encoding system 100 and decoding system 200 maintain three bitmaps: a previously-decoded bitmap, a background bitmap, and a separation bitmap. Referring now to FIG. 3, there are illustrated previous bitmap 301, background bitmap 302, and separation bitmap 303. Previous bitmap 301 is a subset of the last complete bitmap decoded by decoding system 200. Background bitmap 302 is a representation of the static part of the scene, i.e. the scene that would be viewed if all foreground objects were removed. Separation bitmap 303 identifies which portion of previous bitmap 301 is background and which portion is foreground. In alternative preferred embodiments, decoding system 200 may require bitmaps for the picture currently being decoded, although it is possible to partially combine these bitmaps with previous bitmaps, as will be understood by those skilled in the art in light of the disclosure herein.

As will be understood, previous bitmap 301 normally comprises three planes, a luma bitmap of luma pixels at a relatively high resolution, and two chroma bitmaps (typically comprising U and V chroma pixels) at a relatively lower resolution. In some embodiments, however, the two chroma bitmaps may be provided at the same resolution as the luma bitmap. For illustrative purposes, previous bitmap 301 represents only the luma pixels. Background bitmap 302 similarly may comprise three such separate bitmaps and, for illustrative purposes, is shown comprising only luma pixels.

Those skilled in the art will further appreciate that in a preferred embodiment each pixel of bitmaps 301, 302 comprises an 8-bit value ranging from 0 to 255, although in alternative embodiments other bit sizes or ranges may be utilized.

In a preferred embodiment, separation bitmap 303 is binary, i.e. it is a bit plane comprising one bit per pixel. However, as will be understood by those skilled in the art, several bits per pixel may be utilized in a separation bitmap to indicate the ratio of blending of foreground and background for the decoded pixel at a particular bitmap location. In further alternative preferred embodiments, additional bitmaps may be stored; for example, bitmaps of the last four decoded pictures may be stored, along with a separate foreground bitmap, which allow more choices for motion compensation.

Encoding system 100 utilizes normal motion vectors only for foreground objects. A separate set of vectors applies to the background. It is assumed that background motion is due to camera motion and can be described by a small number of global vectors such as pan, tilt, and zoom. Background bitmap 302 is constructed as follows. At the start of a video conference, a background bitmap is transmitted to decoding system 200. This bitmap 302 is stored in both encoding system 100 and decoding system 200, as will be appreciated. In order for encoding system 100 to transmit background bitmap 302 to decoding system 200, encoding system 100 first separates foreground and background in accordance with any suitable technique. In a first preferred embodiment, the initial video picture encoded is presumed to be the background, and statistics are monitored for each pixel thereafter. If a pixel shows long-term stability with little variation, it can be assumed to be a background pixel.

As illustrated in FIG. 3, previous bitmap 301 is a rectangular part of the most recently decoded bitmap. As illustrated, previous bitmap 301 is 8 pixels wide and 16 pixels high. The # symbol represents a foreground object, for example an arm 310 of a speaker. Other symbols such as +, −, and =, represent a fixed background, as will be understood. Background bitmap 302 represents the background with no occluding foreground objects. In separation bitmap 303, a 1 in a given location indicates that the pixel in previous bitmap 301 at that location belongs to a foreground object, and a 0 indicates that the pixel is a background pixel. As will be understood, pixels of arm 310 may have a range of values, although for purposes of illustration all such pixels are represented by the # symbol. Similarly, pixels of the background portion of previous bitmap 301 and the background stored in background bitmap 302 also have a range of values and exhibit various structures and features. However, for purposes of illustration the background pixels are represented by +, =, and = symbols to represent a background structure.

Figure 4:
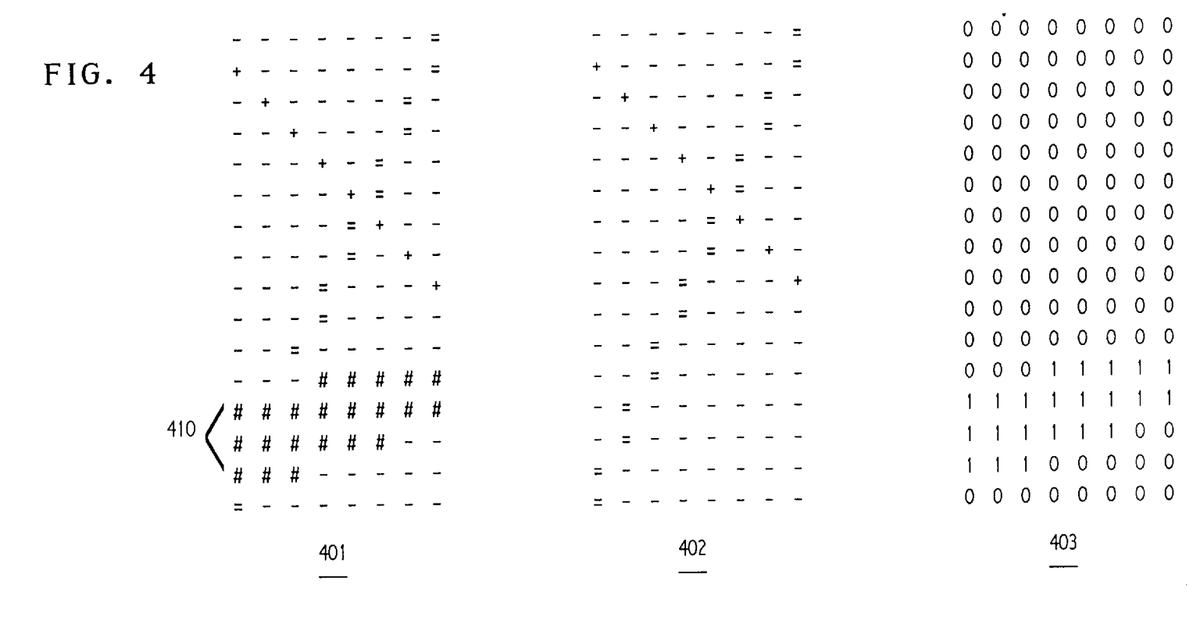

Referring now to FIG. 4, there are illustrated previous bitmap 401, background bitmap 402, and separation bitmap 403, wherein previous bitmap 401 and separation bitmap 403 have changed from FIG. 3 along with the motion of the arm 310. Thus, FIG. 4 represents the bitmaps after the next picture has been decoded by decoding system 200. The update rate is assumed for this example to be relatively low, so that the arm 310 in FIG. 3 has moved a significant distance down, approximately 8 pixels, becoming arm 410 in FIG. 4. Background bitmap 402 is unchanged from background bitmap 302. Separation bitmap 403 is changed from its previous form, separation bitmap 303, to reflect the new position of the arm.

In a preferred embodiment, motion vectors operate on square blocks of (8×8) pixels. In the exemplary bitmaps of FIGS. 3 and 4, each bitmap comprises two such blocks, an upper block and a lower block. The encoding instructions required to change the bitmaps from the state shown in FIG. 3 to that in FIG. 4 is as follows. The upper block, i.e. rows 1 through 8, of bitmap 401 is constructed by replacing the previous block (i.e. the upper block of previous bitmap 301 of FIG. 3) with the background (i.e. the upper block of background bitmap 402=302). The lower block of bitmap 401, i.e. rows 9 through 16, is constructed using a motion vector of 8 pixels in the vertical direction. This motion vector instructs decoding system 200 to move the foreground only from previous bitmap 301 down 8 pixels, and to update both the decoded bitmap and separation bitmap to provide bitmaps 401 and 403, respectively.

Residual Errors

After the new picture has been constructed, any residual errors are reduced by conventional encoding schemes, for example vector quantization or transform coding. Separation bitmap 402 may also be changed, as will be appreciated. In a preferred embodiment, residual coding may be of two types. The first type corrects only the foreground, and the second type corrects both the foreground and background. In alternative preferred embodiments, a third type may be employed which corrects the background only.

Because the background should change predictably or infrequently, there will usually be less need to update the background bitmap other than changes. When necessary, any background changes may be made in accordance with the above-described global vectors. Foreground objects that move and that are motion compensated, however, will typically require updating or correcting frequently through the use of the above-described residual errors. Whenever the background changes, for example a light is turned on in the room that increases the brightness of the background, the background may also be updated over time with background residual error information. As will be appreciated, in such cases care must be taken to avoid updating the background when changes are merely transient, for example temporary distortions caused by a foreground object moving in front of the background features. Thus, in a preferred embodiment, the background is updated only when changes occur that are determined to be nontransient. For example if the camera pans and the background scene scrolls, the background could be updated with a global panning vector, as will be appreciated by those skilled in the art.

Blended Separation Maps

As indicated above, in a preferred embodiment a relatively simple bitmap may be utilized in which one bit per pixel indicates foreground or background. In alternative preferred embodiments, a separation bitmap may contain a plurality of bits per pixel location to indicate a foreground/background mix to be used to construct the displayed bitmap. If a one-bit, i.e. binary, separation bitmap is utilized, reconstructed motion-compensated objects sometimes have an unnaturally sharp edge or boundary between the edge of the object and the background. Related artifacts that may be caused by such a binary separation bitmap include noticeable jagged edges along the contours of the foreground objects.

Such artifacts may be reduced through the use of a blended separation bitmap. In this embodiment, pixels within the interior of the reconstructed foreground object receive a value of 100% of the previous foreground object, taking into account any residual error corrections made thereto. Pixels outside the border of the motion-compensated object that are a part of the background are assigned a value of 100% of the background. However, pixels at and near the outer edge or border of the object could be given a mix or blend of foreground and background pixels. For example, consider the following horizontally arranged pixels:

$B_1 B_2 | F_1 F_2$ where the vertical line represents the edge of an object, the B pixels are background pixels outside of and to the left of the object's border, and the F pixels are pixels of the object to the right of its left border. In this case, as will be appreciated by those skilled in the art, to avoid an artifact along the boundary, pixel $B_1$ is set equal to the previous background pixel at that location, while $B_2$ is a blend of 75% background, 25% foreground object pixel. $F_2$, being completely within the interior of the object, is equal to the corresponding previous object pixel, while F1, being near the edge, is a blend of 25% background, 75% object pixel. As will be understood, other blend percentages and blending schemes could be used.

The blending ratio R could be stored in a multibit separation bitmap (not shown) containing the value R for each pixel location, rather than merely a 1 or 0 as in separation bitmaps 303, 403. If B is the value of a background pixel, P is the value of the corresponding pixel from the previous bitmap, and R is the blend ratio having values between 0 and 1, where 0=all background and 1=all foreground, then the value of the foreground pixel F is given, for R>0, by:

$$F=P/R-(R-1)*B/R$$

The value of the blended pixel is given by:

$$P=R*F+(R-1)*B$$

Flow Chart

Figure 5:
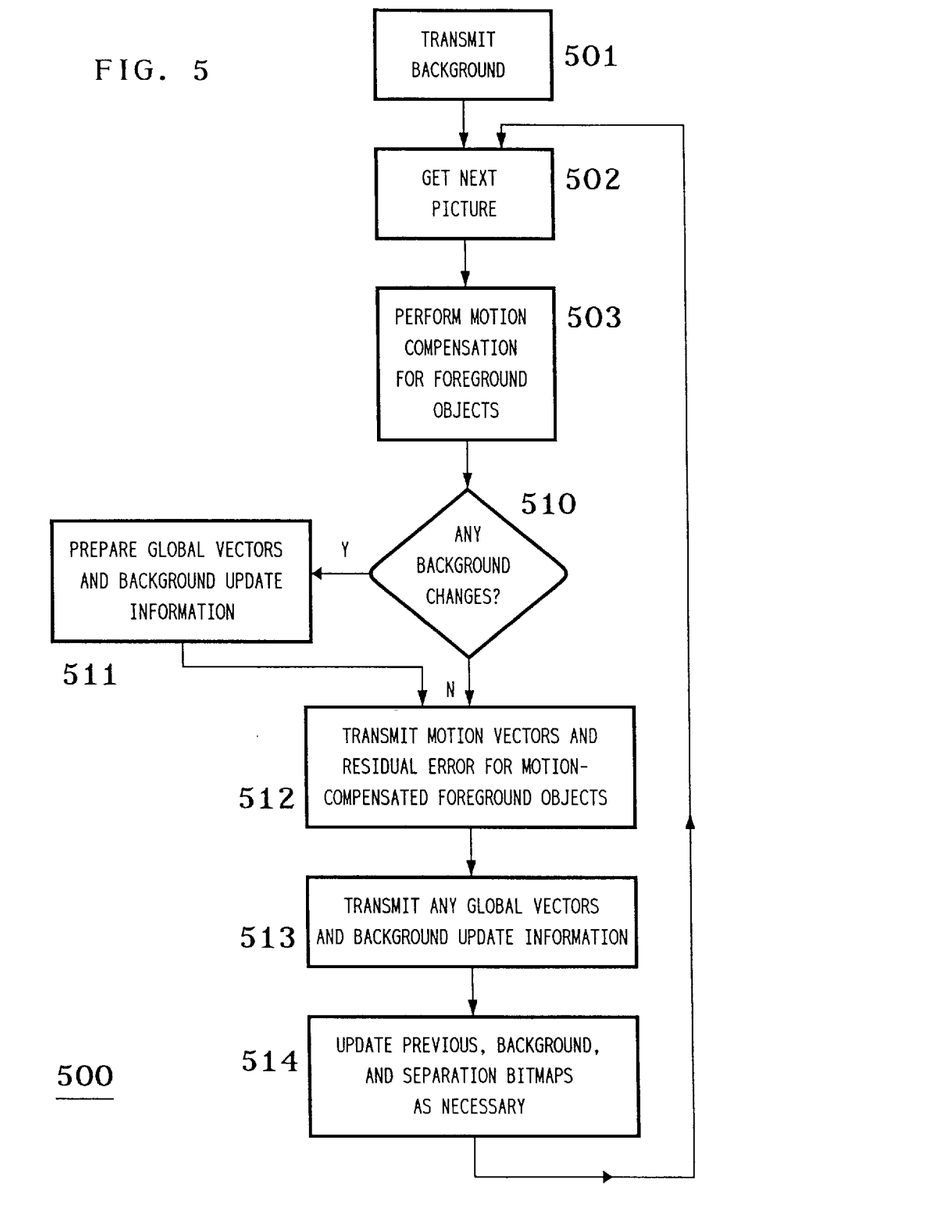
FIG. 5 is a flow chart of the method of operation of the video system of FIG. 1.

Referring now to FIG. 5, there is shown flow chart 500 of the method of operation of video encoding system 100 of FIG. 1. As illustrated, encoding system 100 determines and stores the background and transmits the background to decoding system 200 as a background bitmap, as described hereinabove (step 501). As will be understood, any initial foreground objects may be transmitted at this time for initial decoding and display as well. The next picture is then captured by encoding system 100 for encoding and transmission to decoding system 200 (step 502). Encoding system 100 performs motion compensation with respect to foreground objects, which includes the generation of (foreground) motion vectors and any (foreground) residual error (step 503).

Next, if there are any significant background changes (step 510), encoding system prepares any necessary global vectors (such as pan, tilt, and zoom information) and other background update information such as background residual error (step 511). Encoding system 100 then transmits foreground motion vectors and residual error for the motion-compensated foreground objects (step 512), and also transmits any background global vectors and related information (step 513). Decoding system then uses this information received with respect to the current picture to update the previous, background, and separation bitmaps as necessary, as described hereinabove (step 514). The process may then be repeated for subsequent pictures (steps 514 and 502).

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for encoding pictures of a sequence of pictures, comprising the steps of:

(a) determining with an encoding system a relatively fixed background of the sequence of pictures;

(b) transmitting the background to a decoding system;

(c) separating foreground objects of a current picture of the sequence of pictures from the background;

(d) performing motion compensation encoding of the foreground objects with respect to at least one previous picture;

(e) transmitting the encoded foreground objects to the decoding system; and (f) repeating steps (c) through (e) for subsequent current pictures of the sequence of pictures without repeating step (b).

2. The method of claim 1, wherein step (a) comprises the step of selecting the first picture of the sequence of pictures as the background.

3. The method of claim 1, wherein step (a) comprises the step of selecting as the background a picture having no foreground objects.

4. The method of claim 1, comprising the further step of:

(g) transmitting background updating information to the decoding system in accordance with changes to the background.

5. The method of claim 4, wherein the background updating information comprises global motion vectors and background residual error.

6. The method of claim 4, further comprising the steps of:

(h) storing the background in a background bitmap;

(i) storing a decoded picture bitmap corresponding to the current picture, the decoded picture bitmap comprising foreground objects and portions of the background not occluded by the foreground objects; and (j) storing a separation bitmap which indicates the foreground or background status of pixels of the decoded picture bitmap.

7. The method of claim 6, comprising the further step of:

(k) updating the background bitmap, decoded picture bitmap, and separation bitmap.

8. The method of claim 6, wherein the separation bitmap is a binary bitmap which indicates whether each pixel of the decoded picture bitmap is a foreground or background pixel.

9. The method of claim 6, wherein the separation bitmap is a multibit bitmap which indicates a foreground/background blend ratio for each pixel of the decoded picture bitmap.

10. The method of claim 9, wherein:

pixels wholly inside a foreground object have a 100% foreground blend ratio;

pixels wholly outside all foreground objects have a 100% background blend ratio; and pixels near a boundary between a foreground object and the background have a blend ratio having both foreground and background components.

11. A computer-implemented apparatus for encoding pictures of a sequence of pictures, comprising:

(a) an encoding system for determining a relatively fixed background of the sequence of pictures;

(b) means for transmitting the background to a decoding system;

(c) means for separating foreground objects of a current picture of the sequence of pictures from the background;

(d) means for performing motion compensation encoding of the foreground objects with respect to at least one previous picture;

(e) means for transmitting the encoded foreground objects to the decoding system; and (f) means for repeating the functions of means (c) through (e) for subsequent current pictures of the sequence of pictures without repeating the transmitting of means (b).

12. The apparatus of claim 11, wherein the encoding system comprises means for selecting the first picture of the sequence of pictures as the background.

13. The apparatus of claim 11, wherein the encoding system comprises means for selecting as the background a picture having no foreground objects.

14. The apparatus of claim 11, further comprising:

(g) means for transmitting background updating information to the decoding system in accordance with changes to the background.

15. The apparatus of claim 14, wherein the background updating information comprises global motion vectors and background residual error.

16. The apparatus of claim 14, further comprising:

(h) memory means for storing the background in a background bitmap;

(i) memory means for storing a decoded picture bitmap corresponding to the current picture, the decoded picture bitmap comprising foreground objects and portions of the background not occluded by the foreground objects; and (j) memory means for storing a separation bitmap which indicates the foreground or background status of pixels of the decoded picture bitmap.

17. The apparatus of claim 16, comprising the further step of:

(k) means for updating the background bitmap, decoded picture bitmap, and separation bitmap.

18. The apparatus of claim 16, wherein the separation bitmap is a binary bitmap which indicates whether each pixel of the decoded picture bitmap is a foreground or background pixel.

19. The apparatus of claim 16, wherein the separation bitmap is a multibit bitmap which indicates a foreground/background blend ratio for each pixel of the decoded picture bitmap.

20. The apparatus of claim 19, wherein:

pixels wholly inside a foreground object have a 100% foreground blend ratio;

pixels wholly outside all foreground objects have a 100% background blend ratio; and pixels near a boundary between a foreground object and the background have a blend ratio having both foreground and background components.

21. The apparatus of claim 11, further comprising:

(f) a bus; and (g) a memory device electrically connected to the bus.

22. A computer-implemented method for decoding pictures of a sequence of pictures, comprising the steps of:

(A) decoding encoded pictures to generate a decoded picture; and (B) displaying the decoded picture, wherein the encoded pictures were generated by:

(a) determining with an encoding system a relatively fixed background of the sequence of pictures;

(b) transmitting the background to the decoding system;

(c) separating foreground objects of a current picture of the sequence of pictures from the background;

(d) performing motion compensation encoding of the foreground objects with respect to at least one previous picture;

(e) transmitting the encoded foreground objects to the decoding system; and (f) repeating steps (c) through (e) for subsequent current pictures of the sequence of pictures without repeating step (b).

23. The method of claim 22, wherein step (a) comprises the step of selecting the first picture of the sequence of pictures as the background.

24. The method of claim 22, wherein step (a) comprises the step of selecting as the background a picture having no foreground objects.

25. The method of claim 22, wherein the encoded pictures were generated by the further step of:
   (g) transmitting background updating information to the decoding system in accordance with changes to the background.

26. The method of claim 25, wherein the background updating information comprises global motion vectors and background residual error.

27. The method of claim 25, wherein the encoded pictures were further generated by the further steps of:
   (h) storing the background in a background bitmap;
   (i) storing a decoded picture bitmap corresponding to the current picture, the decoded picture bitmap comprising foreground objects and portions of the background not occluded by the foreground objects; and
   (j) storing a separation bitmap which indicates the foreground or background status of pixels of the decoded picture bitmap.

28. The method of claim 27, wherein the encoded pictures were further generated by the further step of:
   (k) updating the background bitmap, decoded picture bitmap, and separation bitmap.

29. The method of claim 27, wherein the separation bitmap is a binary bitmap which indicates whether each pixel of the decoded picture bitmap is a foreground or background pixel.

30. The method of claim 27, wherein the separation bitmap is a multibit bitmap which indicates a foreground/background blend ratio for each pixel of the decoded picture bitmap.

31. The method of claim 30, wherein:
   pixels wholly inside a foreground object have a 100% foreground blend ratio;
   pixels wholly outside all foreground objects have a 100% background blend ratio; and
   pixels near a boundary between a foreground object and the background have a blend ratio having both foreground and background components.

* * * * *